United States Patent Office

3,329,525
Patented July 4, 1967

3,329,525
PAPER BEARING A POLYVINYL ALCOHOL-AMYLOSIC COMPOSITION
Robert M. Powers, Decatur, Ill., assignor to A. E. Staley Manufacturing Company, Decatur, Ill., a corporation of Delaware
No Drawing. Filed June 29, 1964, Ser. No. 378,967
13 Claims. (Cl. 117—155)

This application is a continuation-in-part of my application Ser. No. 309,337, filed Sept. 16, 1963, and now abandoned.

This invention relates to paper coated with a composition comprising amylosic material and polyvinyl alcohol.

The manufacturers of polyvinyl alcohol have indicated that polyvinyl alcohol is an excellent grease-proofing agent. However, polyvinyl alcohol has several drawbacks, such as poor leveling properties on paper, high viscosity in water at low total solids and high cost. For example, when polyvinyl alcohol is applied to paper (or paper board) with a wire wrapped rod, the coated paper dries with striations apparent to the naked eye and touch. Such striations are objectionable from an aesthetic point of view and from a functional point of view. The latter results in the coated paper not being uniformly grease-proof. Further, the flexibility of the paper is decreased by the non-uniform coating. The high viscosity of aqueous solutions of polyvinyl alcohol at low total solids is undesirable since it places a limitation on either the concentration of the polyvinyl alcohol in solution or upon the coating equipment to be used. As might be expected, the higher the concentration of treating material the more grease-proofing material that can be applied in a single application.

It has been proposed by the manufacturers of polyvinyl alcohol that low cost extenders, such as starch, be used with polyvinyl alcohol in order to reduce the cost of the polyvinyl alcohol composition. However, it is generally recommended that such diluents be used with polyvinyl alcohol as a size (or prime coat) prior to the application of a continuous top coat composed wholly of polyvinyl alcohol. This is due to the fact that polyvinyl alcohol coatings, which contain any sizeable concentration of starch extender, do not form continuous, pinhole-free, grease-proof coatings. Further, most starches are not deemed to be very compatible with polyvinyl alcohol. (See for example, Du Pont literature on the "Elvanols" and Air Reduction Company literature on the "Vinols"). It would appear from this literature that aqueous mixtures of polyvinyl alcohol and pasted corn starch are only compatible when the polyvinyl alcohol comprises either less than 10% of the dry solids or more than 80% of the dry solids. The Airco literature also indicates that this same incompatibility is found in applied coatings of starch and polyvinyl alcohol.

The object of this invention is to provide inexpensive grease-resistant coatings for paper.

I have now found that compositions comprising amylosic material and polyvinyl alcohol form excellent pinhole free, continuous, grease-resistant coatings having no visible striations (i.e. with excellent leveling characteristics). Further, at the same total solids, aqueous amylosic-polyvinyl alcohol solutions have a lower viscosity than polyvinyl alcohol. Unlike the previously mentioned extenders, which have been proposed as replacements for small amounts of polyvinyl alcohol, it is possible to use from about 1 to 19 parts by weight amylosic material per each part by weight of polyvinyl alcohol and still form a pinhole free, continuous, grease-proof coating. Of course, higher concentrations of polyvinyl alcohol, e.g. 19 parts by weight polyvinyl alcohol per each part by weight amylosic material, can be used.

In general, the best results at the lowest cost have been obtained using from about 2 to 12 parts amylosic material per each part by weight of polyvinyl alcohol. The polyvinyl alcohol, besides being an excellent grease-proofing agent, plasticizes the amylosic material and tends to toughen the coating. Further, the polyvinyl alcohol tends to reduce pinholing to a minimum. The amylosic material, which is also an excellent grease-proofing agent, reduces the cost of the composition, reduces the viscosity of polyvinyl alcohol solutions and improves the leveling properties of the composition.

For the purposes of this invention, the term "amylosic material" refers to the amylose resulting from the separation of amylose and amylopectin components of starch, or the whole starch which is composed of at least 50% amylose. Commercially available sources of amylosic material include "Nepol" amylose (the amylose fraction of corn starch), "Superlose" (the amylose fraction of potato starch), "Amylomaize" or "Amylon" (high-amylose corn starch containing approximately 54% amylose), "Amylon VII" (high-amylose corn starch containing up to 70% amylose), etc. The amylosic coatings based on high-amylose corn starch can be simulated by mixing corresponding concentrations of separated amylose with separated amylopectin. Preferably, the amylopectin content of the amylosic material is less than 20% by weight since the higher the concentration of amylose the better the strength and flexibility of the coating. Various derivatives of amylosic material (amylose acetate, hydroxyethyl amylose, hydroxypropyl amylose, etc.) such as those described in U.S. Patent 3,038,895 can be employed.

Preferably less than about 20 mole percent of the monomeric units in the polyvinyl alcohol contain acetyl groups, since the higher the concentration of acetyl groups, the poorer the compatibility of polyvinyl alcohol and amylosic material.

The amylosic-polyvinyl alcohol coatings of this invention can be applied by any of the techniques normally used to coat paper webs. For example, the paper web can be coated using an air knife coater, Champion knife coater, trailing blade coater, doctor knife, size press, spray applicator, etc. In general, it is preferable to use a roll applicator, particularly an air knife coater as disclosed in commonly assigned application Ser. No. 296,660, filed July 22, 1963, in the name of R. W. Best and R. M. Powers, now abandoned, in order to form a smooth, continuous, pinhole free, grease-proof top coat. However, the various other paper coating techniques, particularly the size press, are useful for applying amylosic-polyvinyl alcohol size. Paper bearing a size coat can be used in offset printing, when it is desirable to slow down the penetration of the hydrophobic ink (render the paper grease-resistant), or as a subbing layer for continuous, pinhole-free, grease-proof top coats.

In utilizing these techniques, the polyvinyl alcohol (in either the dry form or dissolved in solvent, such as water) is added to a suitable solution of amylosic material (in water at pH 7, in aqueous alkali, in aqueous formaldehyde, in dimethyl sulfoxide, etc.). If desired, the polyvinyl alcohol can be mixed with an aqueous slurry of amylosic material prior to the dissolution of the amylosic material. Regardless of how the polyvinyl alcohol-amylosic solution is prepared, it is continuously supplied to the applicator from which it is applied to the paper.

Of course, various other additives can be added to the coating composition, such as defoamers, anti-blocking gents (various pigments), additional plasticizers (e.g. glycerol, sorbitol, etc.).

The following examples are merely illustrative and are not to be construed as limiting the scope of our invention.

*Example I*

An aqueous solution of defatted amylose was prepared by heating to 154° C. a 10% solids aqueous slurry of 6.8 parts by weight corn amylose, 1.2 parts by weight corn amylopectin and 2 parts dissolved polyvinyl alcohol having about 2 acetyl groups per 100 monomeric units. A starch cooker of the type described in application Ser. No. 790,487, filed Feb. 2, 1959, now U. S. Patent 3,101,284 was used. This solution was continuously supplied to a preheated coating pan (70° C.) of an air-knife coater. The aqueous treating solution was continuously applied to a non-water absorptive applicator roll, which was partially immersed in the coating pan. The amylose composition, while the amylose was in an ungelled state, was transferred from the surface of the roll to a paper web (a roll of 45 pound paper), which was moving at 250 feet per minute. Immediately thereafter, before the overlying amylose coating composition gelled, the coating was smoothed by passing the paper web between a roll surface and an air blast from a jet. The coated side of the paper was exposed to the air blast. The coated paper was dried and then run through the air-knife coater a second time. The paper, which was dried a second time, had an amylose coating of about 2 pounds per 1,000 square feet of paper.

A 4" x 4" square of paper passed the standard grease-proofing test of the Technical Association of the Pulp and Paper Industry. The backside of the coated paper showed no passage of dye when 1.1 mil. turpentine containing an oil soluble red dye was dropped on a five gram mound of sand, which was placed on the coated side of the paper.

*Example II*

The coating procedure described in Example I was repeated with essentially the same results using 11 point paper board and grease-proofing composition comprising a 10% solids aqueous slurry of 1.7 parts by weight polyvinyl alcohol and 8.3 parts by weight hydroxypropyl amylose assaying on an average 0.1 mole propylene oxide per anhydroglucose unit (.1 MS).

*Example III*

A 10% solids aqueous solution of 3 parts by weight polyvinyl alcohol and 7 parts by weight 0.1 MS hydroxypropyl amylose was coated on 11 point paper board with a #18 wire wrapped rod. After the first coat dried, a second coat of the grease-proofing composition was applied. The coated paper board passed the test described in Example I. Further, the coating had no striations from the wire wrapped rod.

*Example IV*

This example illustrates that amylose improves the leveling of polyvinyl alcohol coatings. A series of 10% solids aqueous solutions of polyvinyl alcohol and 0.3 MS hydroxyethyl amylose were coated on 11 point paper board with a #10 wire wrapped rod. The results are set forth below in Table I.

TABLE I

| Parts by Weight | | Leveling |
|---|---|---|
| Amylose | Polyvinyl Alcohol | |
| 0 | 10 | Poor. |
| .5 | 9.5 | Do. |
| 1.0 | 9 | Fair. |
| 3 | 7 | Excellent. |

The above table illustrates that the leveling of polyvinyl alcohol solution is improved by the addition of 1 part by weight amylose for each 9 parts by weight polyvinyl alcohol and the leveling of polyvinyl is markedly improved by the addition of 3 parts by weight amylose for each 7 parts by weight polyvinyl alcohol.

*Example V*

This example illustrates coating the polyethylene side of commercially available corona discharge treated polyethylene coated natural kraft paper, the polyethylene layer being approximately 0.50 mil thick. An aqueous solution of amylose was prepared by heating to 155° C. a 11% solids aqueous slurry of 7.2 parts by weight corn amylose, 0.8 part by weight corn amylopectin and 3 parts by weight polyvinyl alcohol having about 2 acetyl groups per each 100 monomeric units. The amylose composition was applied to the polyethylene side of the flexible sheet in the manner described in Example I, dried and a second coat applied in the same manner. The coated sheet passed the grease-proofing test described in Example I.

*Example VI*

Example I was repeated with essentially the same results except that the amplose composition was applied to the coated side of a paper web which had been sized with a composition comprising clay and 14% by weight alkaline hypochlorite-oxidized starch based on the weight of the clay.

The term "paper" is used in a generic sense to include paper of all varieties, whether coated or uncoated, including paper board, and the terms "coat" and "coated" are inclusive of "size" and "sized."

Since many embodiments of this invention may be made and since many changes may be made in the embodiments described, the foregoing is to be interpreted as illustrative only and my invention is defined by the claims appended hereafter.

I claim:
1. Paper having on at least one surface a coating comprising polyvinyl alcohol and an amylosic material containing at least 50% by weight amylose wherein (1) said amylosic material comprises at least one part by weight per nine parts by weight polyvinyl alcohol, (2) said amylosic material is selected from the group consisting of the separated amylose fraction of whole starch, whole starch containing at least 50% by weight amylose and mixtures thereof.
2. The article of claim 1 wherein said amylosic material is a hydroxypropyl ether derivative.
3. The article of claim 1 wherein said amylosic material comprises from one to nineteen parts by weight per each part by weight polyvinyl alcohol.
4. The article of claim 3 wherein said amylosic material comprises the separated fraction of whole starch.
5. The article of claim 3 wherein the amylopectin content of said coating is less than 20% by weight.
6. Paper having on at least one surface a pinhole-free, smooth, grease-resistant coating, said grease-resistant coating comprising polyvinyl alcohol and an amylosic material containing at least 50% by weight amylose wherein (1) said amylosic material comprises at least one part by weight per nine parts by weight polyvinyl alcohol, (2) said amylosic material is selected from the group consisting of the separated amylose fraction of whole starch, whole starch containing at least 50% by weight amylose and mixture thereof.
7. The article of claim 6 wherein said amylosic material is a hydroxypropyl ether derivative.
8. The article of claim 6 wherein said amylosic material comprises from one to nineteen parts by weight per each part by weight polyvinyl alcohol.
9. The article of claim 6 wherein said amylosic material comprises from two to twelve parts by weight per each part by weight polyvinyl alcohol.
10. The article of claim 9 wherein said amylosic material comprises the separated fraction of whole starch.
11. The article of claim 9 wherein said coating contains less than 20% by weight amylopectin.

12. The process, which comprises coating at least one surface of paper with an aqueous composition comprising polyvinyl alcohol and an amylosic material containing at least 50% by weight amylose wherein (1) said amylosic material comprises at least one part by weight per nine parts by weight polyvinyl alcohol, (2) said amylosic material is selected from the group consisting of the separated amylose fraction of whole starch, whole starch containing at least 50% by weight amylose and mixtures thereof.

13. The process of claim 12 wherein said amylosic material comprises from one to nineteen parts by weight per each part by weight polyvinyl alcohol.

References Cited

UNITED STATES PATENTS

| | | | |
|---|---|---|---|
| 2,256,853 | 9/1941 | Schwartz | 117—156 X |
| 2,325,798 | 8/1943 | Porter | 117—156 X |
| 2,798,990 | 7/1957 | Davis | 117—165 X |
| 2,822,581 | 2/1958 | Muetgeert et al. | 106—210 X |
| 2,949,382 | 8/1960 | Dickerman et al. | 117—156 X |
| 3,076,720 | 2/1963 | Rice et al. | 117—86 X |

FOREIGN PATENTS 6,410,751  9/1964  Netherlands.

OTHER REFERENCES

Egan, F. W.; Some Fundamentals of Coating Methods. The Paper Industry and Paper World, p. 1142–1145, December 1944.

Kaplan, Paul: Potential Industrial Use of Amylose. Cereal Science Today 3(8) pp. 206–209, October 1958. TP 1 C 34.

WILLIAM D. MARTIN, *Primary Examiner.*

H. W. MYLIUS, M. R. LUSIGNAN, *Assistant Examiners.*